(12) United States Patent
Birkelund

(10) Patent No.: US 10,698,438 B2
(45) Date of Patent: Jun. 30, 2020

(54) DRIVING CONTROL DEVICE COMPRISING A LOCKING MECHANISM

(71) Applicant: AUTOMAX APS, Vorbasse (DK)

(72) Inventor: Max Birkelund, Vorbasse (DK)

(73) Assignee: AUTOMAX APS, Vorbasse (DK)

( * ) Notice: Subject to any disclaimer, the term of this patent is extended or adjusted under 35 U.S.C. 154(b) by 414 days.

(21) Appl. No.: 15/510,128

(22) PCT Filed: Sep. 3, 2015

(86) PCT No.: PCT/DK2015/050258
§ 371 (c)(1),
(2) Date: Mar. 9, 2017

(87) PCT Pub. No.: WO2016/050248
PCT Pub. Date: Apr. 7, 2016

(65) Prior Publication Data
US 2017/0293316 A1    Oct. 12, 2017

(30) Foreign Application Priority Data

Sep. 9, 2014  (DK) .................................. 2014 70551

(51) Int. Cl.
*G05G 1/487*    (2008.04)
*F16C 11/06*    (2006.01)
(Continued)

(52) U.S. Cl.
CPC .............. *G05G 1/487* (2013.01); *B60K 26/02* (2013.01); *B60T 7/06* (2013.01); *B60T 7/10* (2013.01);
(Continued)

(58) Field of Classification Search
CPC .. G05G 1/487; F16C 11/0623; F16C 11/0604; B60T 11/18; B60T 7/10;
(Continued)

(56) References Cited

U.S. PATENT DOCUMENTS 2,826,089 A    3/1958   Hammack
5,029,679 A    4/1991   Kim et al.
(Continued)

FOREIGN PATENT DOCUMENTS

| DE | 947355 C | 8/1956 |
|----|----------|--------|
| DE | 14806333 A1 | 1/1970 |
| DE | 2615005 A1 | 10/1976 |
| FR | 2407093 A1 | 5/1979 |
| WO | WO 2006/108925 A1 | 10/2006 |
| WO | WO 2015/024570 A1 | 2/2015 |

OTHER PUBLICATIONS

International Search Report and Written Opinion for corresponding International Patent Application No. PCT/DK2015/050258 dated Nov. 20, 2015, 14 pages.

*Primary Examiner* — Jeremy P Severson
(74) *Attorney, Agent, or Firm* — Merchant & Gould P.C.

(57) ABSTRACT

A driving control device for a vehicle, comprising a handle bar interconnected with a brake bar having attachment means for attachment to a brake pedal, the attachment means comprising a locking mechanism comprising an engagement head with a shaft portion and a bail portion having a flat portion, the latter locking mechanism further comprising an engagement socket having a spherical compartment fitting the ball portion and a wall portion in the opening of the socket allowing the engagement head to enter the spherical compartment when the flat portion slides over the wall portion. The driving control device is intended for handicapped drivers and for safe and easy attachment to a vehicle brake pedal.

8 Claims, 3 Drawing Sheets

(51) Int. Cl.
*B60K 26/02* (2006.01)
*B60T 7/06* (2006.01)
*B60T 7/10* (2006.01)
*B60T 11/18* (2006.01)

(52) U.S. Cl.
CPC .............. *B60T 7/102* (2013.01); *B60T 11/18* (2013.01); *F16C 11/0604* (2013.01); *F16C 11/0623* (2013.01); *B60K 2026/029* (2013.01)

(58) Field of Classification Search
CPC ........... B60T 7/102; B60T 7/06; B60K 26/02; B60K 2026/029
See application file for complete search history.

(56) References Cited

U.S. PATENT DOCUMENTS

| | | | |
|---|---|---|---|
| 5,121,651 A * | 6/1992 | Bristow | B60W 30/18 403/122 |
| 5,542,312 A * | 8/1996 | Peters | B60W 30/18 180/333 |
| 5,709,131 A | 1/1998 | Gummery | |
| 6,131,712 A * | 10/2000 | Rhodenizer | B60T 17/223 188/3 H |
| 6,672,281 B1 | 1/2004 | Cinpinski et al. | |
| 9,969,401 B2 * | 5/2018 | Birkelund | B60W 30/18181 |

* cited by examiner

DRIVING CONTROL DEVICE COMPRISING A LOCKING MECHANISM

This application is a National Stage Application of International Patent Application No. PCT/DK2015/050258, filed 3 Sep. 2015, which claims benefit of Serial No. PA 2014 70551, filed 9 Sep. 2014 in Denmark and which applications are incorporated herein by reference. To the extent appropriate, a claim of priority is made to each of the above disclosed applications.

FIELD OF THE INVENTION

The present invention relates to a driving control device comprising a locking mechanism interfacing a brake pedal (or speed pedal) with a hand operable device for handicapped drivers.

BACKGROUND OF THE INVENTION

Handicapped people that are limited to use solely their upper body parts are limited to vehicles having hand operated actuating systems. Car conversion systems in which the accelerator and the brake pedals are hand-operated are known in the art. Mostly, add-on systems are provided with operating lever or levers that is engaged with both accelerating pedal and the brake pedal of the car wherein push and pull operations are operated by the hands of the driver. The challenge in engineering and designing such systems lies in the limited space beneath the steering wheel.

WO2006108925 discloses a driving control device, wherein the lower ends of the operating bars of the driving control device may be attached to the pedals of the vehicle, and the upper ends thereof may be supported in the transverse direction with a mounting piece. The mounting piece comprises a pliable attachment strap that may be tightened around the steering column with a mechanical tightening mechanism.

U.S. Pat. No. 6,672,281 B1 discloses driving control device for a vehicle, the driving control device comprising: a brake bar having in a first end attaching means for attachment to a brake pedal of the vehicle, said brake bar having in a second end a joint to a handle bar; a handle bar for transversely supporting the brake bar at the joint of the brake bar, said handle bar provided with means for electronically regulating the speed of the vehicle, said handle bar provided with a handle in the first end, and attachment means in the second end of the handle bar; and where the attachment means includes a locking mechanism. Meanwhile, the locking mechanism requires that the device is fixedly attached somewhere in the vicinity of the steering column and is not easy to detach.

The devices described in the prior art suffer from several drawbacks. Especially, the prior art locking mechanisms for attachment of the brake bar to a brake pedal of the vehicle are complicated to install and difficult to use for the driver. Moreover, there is a need to improve the safety of the locking mechanisms in order to ensure that the interface between the brake bar and the brake pedal remains intact.

SUMMARY OF THE INVENTION

The present invention overcomes the problems of the prior art by providing a driving control device (1) to a vehicle with an improved locking mechanism for attachment of the brake bar to a brake pedal.

According to the present invention there is provided a driving control apparatus with a locking mechanism for safe and easy attachment to a vehicle brake pedal. The locking mechanism comprises a male part (spherical engagement head) and the female part (spherical engagement socket). The locking is achieved when the head of the ball cannot be readily removed from the socket once the head is secured therein. This is because of the protrusion from the opening of the socket retaining the head in the socket. Retention in the socket is achieved because the head cannot be allowed to slip from the socket.

The driving control device comprises a brake bar (2) having in a first end attaching means (3) for attachment to a brake pedal (not shown) of the vehicle, said brake bar (2) having in a second end a joint (4) to a handle bar (5).

In a preferred embodiment of the present invention the handle bar (5) transversely supports the brake bar at the joint (4) of the brake bar (2). Preferably the handle bar (5) is provided with means for electronically regulating the speed of the vehicle (not shown). In a preferred embodiment the handle bar is provided with a handle (6) in the first end, and attachment means (7) in the second end of the handle bar, wherein the attachment means includes another locking mechanism for releasably attaching the handle bar via a mounting piece (8) to (or near) the steering column (not shown).

Hence, the present invention specifically provides a driving control device (1) for a vehicle, the driving control device comprising:
  a brake bar (2) having in a first end attaching means (3) for attachment to a brake pedal of the vehicle, said brake bar (2) having in a second end a joint (4) to a handle bar (5);
  a handle bar (5) for transversely supporting the brake bar (2) at the joint (4) of the brake bar (2), said handle bar (5) optionally provided with means for electronically regulating the speed of the vehicle, said handle bar (2) provided with a handle (6) in the first end, and attachment means (7) in the second end of the handle bar attachment means (7) includes a locking mechanism for releasably attaching the handle bar (5) to a fixation point in a car, such as a mounting piece (8) mounted on or near the steering column;
  characterized in that the attaching means (3) for attachment to a brake pedal of the vehicle includes a locking mechanism comprising:
    an engagement head (3a) with a ball portion (3b) having a flat portion (3c); and
    an engagement socket (3d) having a spherical compartment (3e) fitting the ball portion (3a) and a wall portion (3f) in the opening of the socket allowing the engagement head (3a) to enter the spherical compartment (3e) when flat portion (3c) slides over the wall portion (3f).

In a preferred embodiment the shaft portion of the engagement head (3a) is configured to be secured to the brake pedal of the vehicle and the engagement socket (3d) is secured to the brake bar (2).

Locking is achieved when the head is in the socket and turned. This is because of the wall portion from the opening of the socket retaining the head in the socket. Retention in the socket is achieved because the head cannot be allowed to slip from the socket. An anti-rotation insert, e.g. one that engages grooves on the shaft, is preferably used to prevent rotation of the ball stud.

The very aim of the present invention is therefore to provide an easily operable and reliable locking mechanism for attachment of the brake bar to a brake pedal.

DETAILED DESCRIPTION OF THE INVENTION

Figure 1:
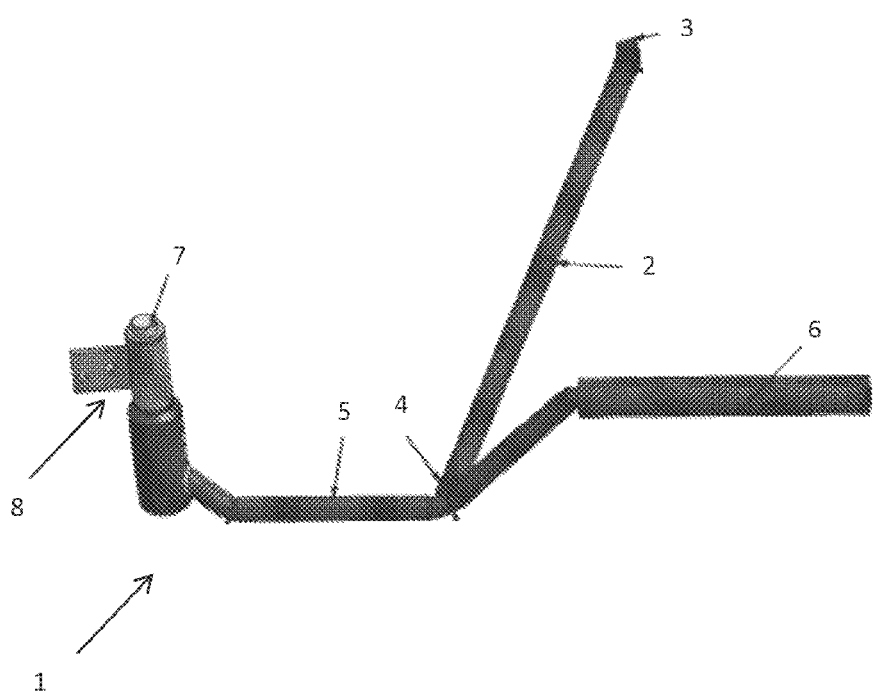
FIG. 1 is a perspective view of a driving control device that can be fixed to the brake pedal in accordance with the present invention.

Specifically and with reference to FIG. 1 there is shown a driving control device (1) for a vehicle, the driving control device comprising a brake bar (2) having in a first end attaching means (3) for attachment to a brake pedal (not shown) of the vehicle, said brake bar (2) having in a second end a joint (4) to a handle bar (5), said handle bar (5) configured for transversely supporting the brake bar at the joint (4) of the brake bar (2), said handle bar (5) provided with means for electronically regulating the speed of the vehicle (not shown), said handle bar provided with a handle (6) in the first end, and attachment means (7) in the second end of the handle bar, wherein the attachment means includes a locking mechanism for releasably attaching the handle bar via a mounting piece (8) to (or near) the steering column (not shown) without the use of tools.

Figure 2:
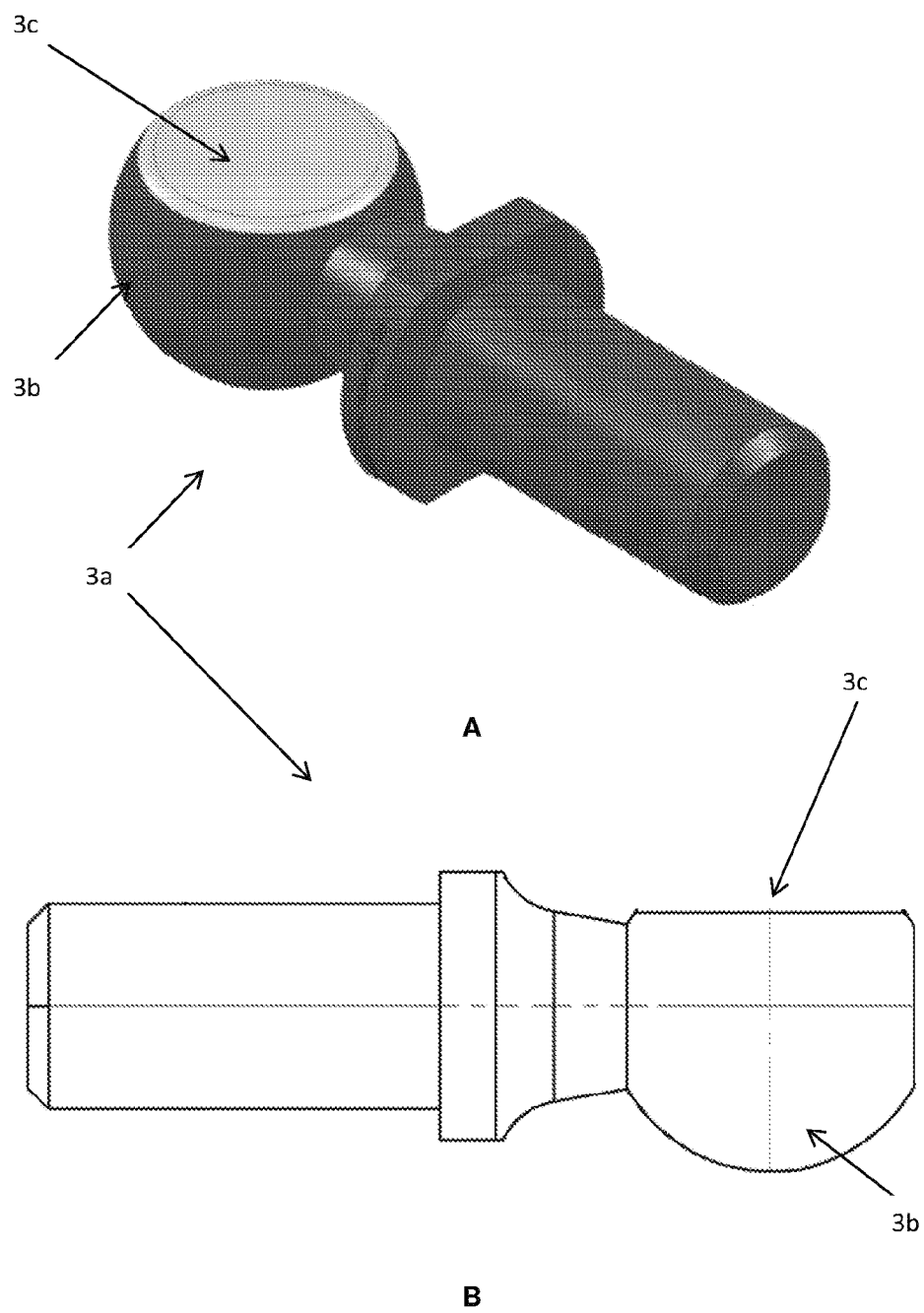
FIG. 2 shows in more detail the male member (spherical engagement head) of the spherical locking joint.
Figure 3:
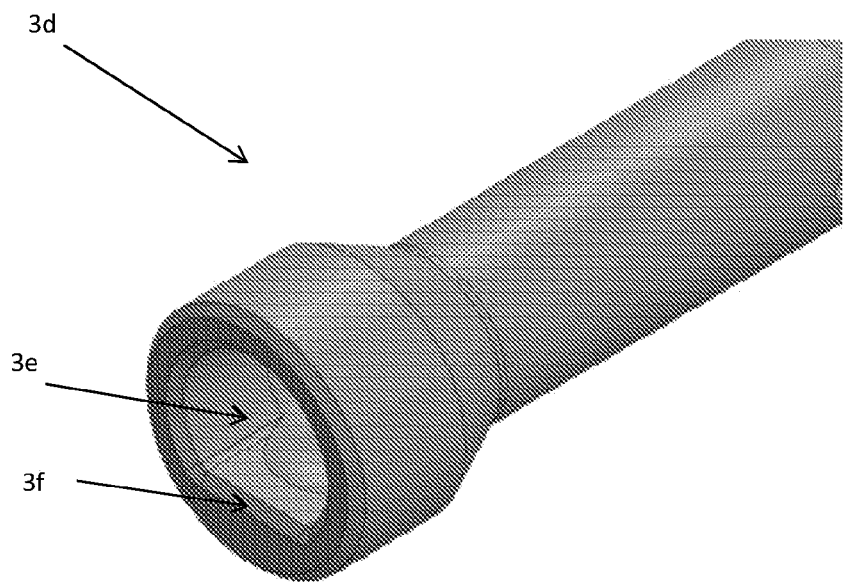
FIG. 3 shows in more detail the female member (spherical engagement socket) of the spherical locking joint.
Figure 3:
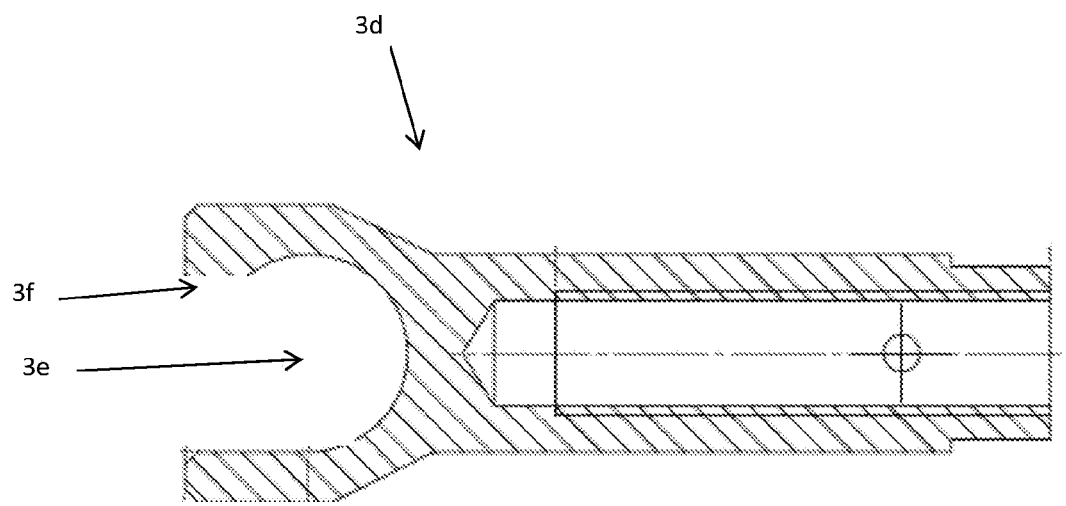

Referring to FIGS. 2 and 3 there is shown the male part (3a, spherical engagement head) and the female part (3b, spherical engagement socket) is shaped such that the head of the ball cannot be readily removed from the socket once the head is secured therein. This is because of the protrusion (3f) from the opening of the socket retaining the head in the socket. Retention in the socket is desired because the head cannot be allowed to slip from the socket.

The invention claimed is:

1. A driving control device for a vehicle, the driving control device comprising:
   a brake bar having in a first end attaching means for attachment to a brake pedal of the vehicle, said brake bar having in a second end a joint to a handle bar;
   a handle bar for transversely supporting the brake bar at the joint of the brake bar, said handle bar provided with a handle in the first end, and attachment means in the second end of the handle bar, the attachment means includes a locking mechanism for releasably attaching the handle bar to a fixation point in a car;
   wherein the first end attaching means for attachment to a brake pedal of the vehicle includes the locking mechanism comprising:
   an engagement head with a shaft portion and a ball portion having a flat portion; and
   an engagement socket having a spherical compartment fitting the ball portion and a wall portion in the opening of the socket allowing the engagement head to enter the spherical compartment when flat portion slides over the wall portion.

2. The driving control device of claim 1, wherein the locking mechanism has an anti-rotation insert to prevent rotation of the engagement head.

3. The driving control device of claim 1, wherein the engagement head and/or engagement socket is made from metal.

4. The driving control device of claim 3, wherein the engagement head and/or engagement socket is made from stainless steel.

5. The driving control device of claim 3, wherein the engagement head and/or engagement socket is made from polyethylene.

6. The driving control device of claim 1, wherein the shaft portion of the engagement head is secured to the brake bar and the engagement socket is configured to be secured to the brake pedal of the vehicle.

7. The driving control device of claim 1, wherein the shaft portion of the engagement head is secured to the brake pedal of the vehicle and the engagement socket is configured to be secured to the brake bar.

8. The driving control device of claim 1, wherein the handle bar includes means for electronically regulating speed of the vehicle.

* * * * *